United States Patent [19]
Takayama

[11] Patent Number: 5,966,265
[45] Date of Patent: Oct. 12, 1999

[54] INFORMATION SIGNAL REPRODUCING APPARATUS HAVING MEANS FOR TRACKING CONTROL

[75] Inventor: Nobutoshi Takayama, Yokohama, Japan

[73] Assignee: Canon Kabushiki Kaisha, Tokyo, Japan

[21] Appl. No.: 08/999,821

[22] Filed: Apr. 2, 1997

Related U.S. Application Data

[63] Continuation of application No. 08/248,435, May 24, 1994, abandoned.

[30] Foreign Application Priority Data

May 28, 1993 [JP] Japan .................................. 5-151438

[51] Int. Cl.$^6$ .......................... G11B 5/584; G11B 15/467
[52] U.S. Cl. .................................. 360/77.13; 360/77.14; 360/73.08; 386/71
[58] Field of Search ........................... 360/77.14, 77.13, 360/70, 73.04, 73.08, 73.09, 73.12; 386/68, 71, 72, 74, 78, 80

[56] References Cited

U.S. PATENT DOCUMENTS

| | | | |
|---|---|---|---|
| 3,845,500 | 10/1974 | Hart | 360/77.13 |
| 5,003,413 | 3/1991 | Miyazaki | 360/77.14 |
| 5,119,246 | 6/1992 | Tomitaka | 360/77.13 |
| 5,311,381 | 5/1994 | Lee | 360/77.13 |
| 5,546,248 | 8/1996 | Sakakibara et al. | 360/77.14 |
| 5,570,248 | 10/1996 | Ido et al. | 360/77.14 |

OTHER PUBLICATIONS

Arter et al, "Digital Slope Pointer for a Linear Track Servo in a Helical Scan Device", IBM Technical Disclosure Bulletin, vol. 19 No. 9 Feb. 1977, pp. 3297–3300.

*Primary Examiner*—Aristotelis M. Psitos
*Assistant Examiner*—James L. Habermehl
*Attorney, Agent, or Firm*—Robin, Blecker & Daley

[57] ABSTRACT

An information signal reproducing apparatus for reproducing information signals from a recording medium on which several parallel tracks are formed, in which a tracking error signal is produced by use of signals reproduced by a head means for tracing the recording medium so as to reproduce signals, and the tracking error signal is sampled with periods which are determined, irrespective of a rotational period of a rotary head, so as to provide a tracking control signal. Further, upon reproduction of information signals from the recording medium on which plural kinds of pilot signal components are recorded at several parallel tracks together with the information signals, a first tracking error signal which is produced in accordance with the pilot signal components among signals reproduced by one of a plurality of heads for tracing the recording medium so as to reproduce signals, and a second tracking error signal which is produced by in accordance with the pilot signal components among signals reproduced by another of the plurality of heads, are selectively used.

17 Claims, 11 Drawing Sheets

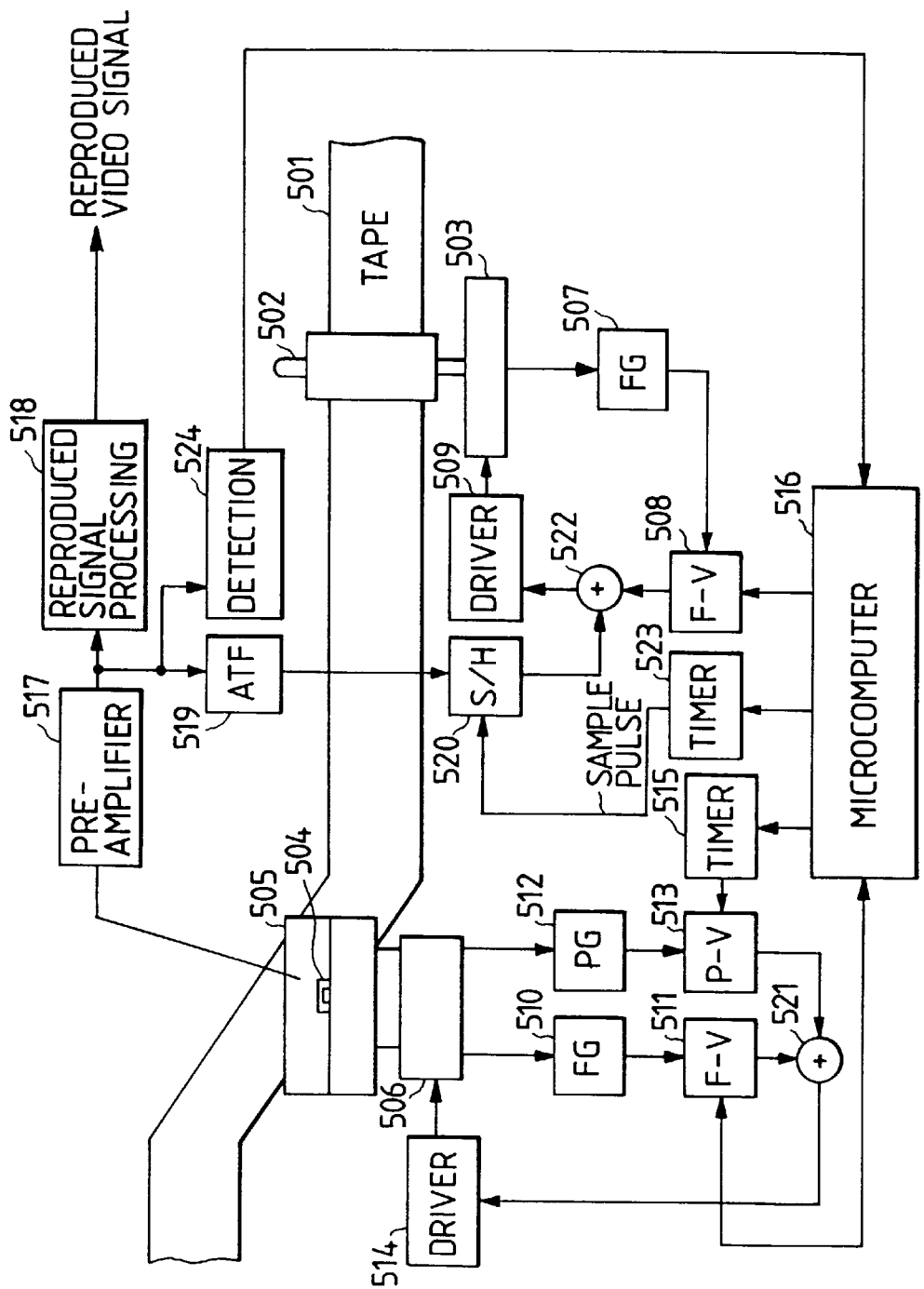

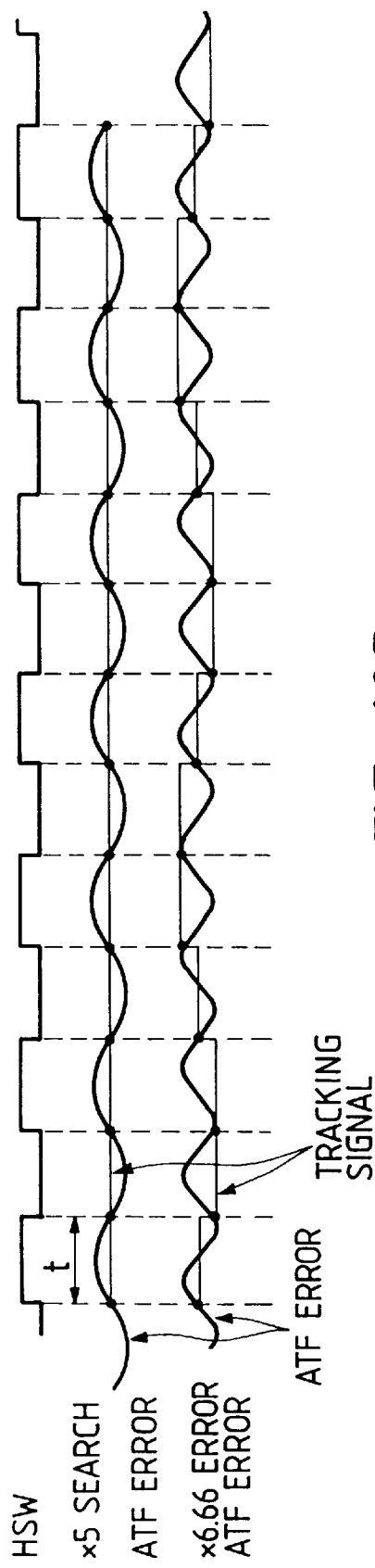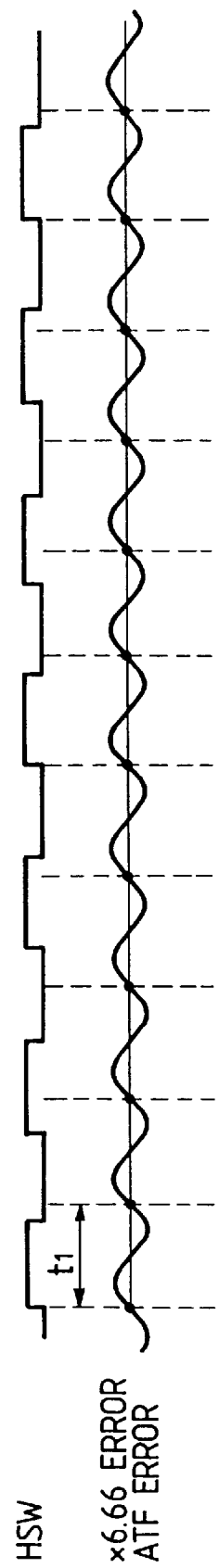

INFORMATION SIGNAL REPRODUCING APPARATUS HAVING MEANS FOR TRACKING CONTROL

This is a continuation application under 37 CFR 1.62 of prior application Ser. No. 08/248,435, filed May 24, 1994, now abandoned.

BACKGROUND OF THE INVENTION

1. Field of the Invention

The present invention relates to an information signal recording apparatus and an information signal reproducing apparatus for several tracks in parallel with one another formed on a recording medium, and in particular to those having features in tracking control for the tracks. For example, the tracking control is used in an apparatus such as a VTR having rotary heads through which video-signals from oblique tracks recorded and formed on a magnetic tape are reproduced.

2. Related Background Art

Heretofore, as a reproducing tracking system for home VTRs, a system (CTL system) in which a stationary magnetic head is provided in a part of a tape path so as to record vertical synchronization signals separated from recording signals upon recording, on an exclusive control track formed longitudinally of a tape, and a system (4fATF system) in which four kinds of pilot signals having relatively low frequencies are circulately recorded on a track, being superposed with main signals such as video signals and audio signals recorded on the same track, by a rotary head for recording and reproducing the main signals, so that crosstalk components reproduced from two adjacent reproducing tracks are compared with each other upon reproduction in order to obtain tracking error signals (ATF signals), have been proposed and put into practice.

However, the above-mentioned CTL system requires a space for the stationary head, and accordingly this system is unadvantageous in view of miniaturization. On the contrary, the 4fATF system is advantageous in view of miniaturization, but is disadvantageous since it requires a complicated circuit arrangement for the four kinds of pilot signals which require several analog circuit elements, and since the pilot signals superposed with digital signals occupy a relative wide band width so as to lower the reliability of the digital signals.

Meanwhile, recently, even for home VTRs, VTRs such as that picture signals in one field are divided and recorded on a plurality of tracks in order to record and reproduce a relatively large volume of information so as to cope with a high image quality and digitalization, have been developed, and accordingly, new tracking systems suitably used for these home VTRs have come under consideration. That is, one of these new tracking systems is such that recording signals are recorded so that frequency components corresponding to a specific kind of pilot signals are contained in modulated signals when digital signals to be recorded is modulated, and the tracking control pilot signals are superposed with the digital signals in a multiplex manner through the above-mentioned modulation.

Referring to FIG. 1A which is a plan view showing a drum of a VTR, a rotary drum 40 comprises a tape 41, a ch-1 head 42 of +azimuth, a ch-2 head 43 of −azimuth, a ch-3 head 44 of +azimuth, and a ch-4 head of −azimuth.

Referring to FIG. 1B which is a front view showing heads that can be seen upon rotation of the drum, for explaining the attachment heights of the heads 42, 45, the ch-1 and ch-2 heads, and ch-3 and ch-4 heads are, in pairs, arranged so as to be adjacent to each other. These pairs are arranged at intervals of an angle of 180 deg. so as to be opposed to each other. As is clear from this figure, the ch-2 and ch-4 heads are offset by a distance h which corresponds to one track pitch on the tape, with respect to the ch-1 and ch-3 heads. With this arrangement, two tracks can be simultaneously recorded or reproduced for every half rotation of the drum, that is, it can cope with a large volume of information.

Next, explanation will be made of the new tracking system with reference to FIG. 2 which is a view illustrating a recording pattern on the tape 41. In order to obtain a tracking error signal, two kinds of pilot signals having frequencies f1, f2 are used, and are superposed with main signals every other track. The rotation of generation of the pilot signals are such that one turn is made through four tracks, and no superposition of the pilot signals occurs on tracks belonging to the heads of +azimuth but pilot signals having f1, f2 are alternately superposed on tracks belonging to the heads of −azimuth. It is noted that reference numerals (1) to (10) denote frame numbers in each of the tracks, that is, signals in one frame are divided and recorded on ten tracks.

As mentioned above, in this example, since four tracks are recorded and reproduced per rotation of the drum, 2.5 turns are required for scanning tracks in one frame, and the pilot rotation and the frame are synchronized with each other by units of two frames (20 tracks).

FIG. 3 is a timing chart showing pilot signals which are superposed with main signals by the heads (ch-1 to ch-4), and the pilot signals which are reproduced from the heads. Explanation will be hereinbelow made with reference to this figure.

In FIG. 3, there are shown a frame signal (a) upon recording or reproduction, a head switch signal (b), pilot timing (c) which is recorded by the ch-1 and ch-3 heads, and which is shown so that it is not superposed, pilot timing (d) which is recorded by the ch-2 and ch-3 heads, which is shown so that pilot signals f1, f2 are alternately recorded, pilot signals (e) which are reproduced by the ch-1 and ch-3 heads in a satisfactory reproducing condition, and reproducing timing (f) of pilot signal components which are similarly reproduced by the ch-2 and ch-3 heads.

As understood from FIG. 2, by setting the head width of each of the heads to be wider than the track pitches, pilot signals recorded on two adjacent tracks can be reproduced in the form of crosstalk at the reproducing timing by the ch-1 and ch-3 heads, and accordingly, this system can provide a tracking error signal (ATF) with the use of such a fact that crosstalk components are equal to each other between the two adjacent tracks if the tracking condition is satisfactory.

FIG. 4 is a block diagram illustrating a circuit for detecting the above-mentioned ATF error signal during reproduction.

Referring to FIG. 4, a head switch signal (HSW) 70 changes over between the reproduced signals from the ch-1 and ch-3 heads in synchronization with the rotation of the drum, a switch circuit 79 changes over between reproduced signals from the ch-1 and ch-3 heads in response to the HSW signal 70, a band-pass filter (BPF) 71 extracts only the reproduced pilot signals f1, f2 from reproduction RF signals, and an amplifier 72 amplifies the reproduced pilot signals which are outputs from the BPF 71. Further, a band pass filter (BPF) 73 extracts only the component f2 from the output of the amplifier 72, a band pass filter (BPF) 74 extracts only the component f1 from the output of the amplifier 72, a detecting circuit for converting the component f2 which is the output of the BPF 73, into a d.c. level, a detecting circuit 76 similarly converts the component f1 into a d.c. level, a differential amplifier circuit 77 receives both detected outputs, and an invertor circuit 78 inverts the signals, and a switch circuit 80 changes over between the output of the differential amplifier 77 and the output of the invertor circuit 78 in response to the HSW 70. A process circuit 81 for reproduced signals in the video-audio system processes the reproduced RF signals so as to provide reproduced video-signals and reproduced audio signals.

Next, explanation will be made of operation. As mentioned above, in the system in this example, the reproduced pilot signals for providing the ATF error signal are included, as crosstalk components from two adjacent tracks (−azimuth track), in the reproduced signals by the ch-1 and ch-3 heads of +azimuth. Accordingly, only the reproduced signals from the ch-1 and ch-3 heads, among the four heads, are required, and the reproduced pilot signals are turned into reproduced signals for only a single system by means of the switch circuit 79. The reproduced signals which contain the main signals are naturally led to the video-audio system reproduction processing circuit 81, and are also applied to the BPF 71 as an ATF circuit for extracting the reproduced pilot signals. Thereafter, the crosstalk components f1, f2 are separated and detected, and are compared by the differential amplifier 77 so as to obtain the ATF error signal for a single system.

Thereafter, the switch circuit 80 selects the invertor circuit 78 upon selection of the ch-3 head, being synchronized with the HSW 70 so as to cope with fore-and-aft positional exchanges of the tracks for the components f1, f2 by the ch-1 and ch-3 heads.

The new tracking system has been hereinabove explained, which will be hereinbelow denoted as "2fATF" as necessary.

Further, as to conventional high speed reproduction such as high speed search of a VTR which carries out analog recording, since the reproduced picture directly corresponds to a position where the reproducing head traces a track, it is common to control the position of the head trace so as to fix a noise bar on an image plane. For this purpose, the magnification of the travel speed of a tape is set to be N (where N is an integer equal to or larger than 2), that is, the travel speed is set to be N times as high as that during reproduction, and a tracking error signal is sample-held in synchronization with the rotation of the head so as to control the rotational speed of a capstan.

That is, during high speed reproduction, a phase reference signal is produced in order to fix a noise bar on an image plane, and a sample-hold pulse is produced from the sample hold circuit for the ATF error signal in synchronization with the rotational phase of the drum. Accordingly, only high speed reproduction having a rotational speed which is N (N is an integer) times as high as that of the drum can be controlled.

On the contrary, more recently, VTRs which can record and reproduce digital signals have been put into practice, and those have been developed as consumer digital VTRs. It is difficult to use a DTF (which is a means in which a head is attached to an actuator such as a bimorph so as to compensate the inclination between a head trace and a track, for preventing lowering of the reproduction RF signal) in a consumer VTR, as is in a business use VTR since it causes the apparatus to be expensive and large-sized. Accordingly, similar to analog VTRs, during high speed search of a digital VTR, a drop of the reproduction signal periodically occurs due to that a head crosses a track.

FIG. 5 shows a head switch pulse HSW and a reproduction RF envelope during a search at a speed which is eleven times as high (in the positive direction). It has been well-known that the reproduction RF signal has a bead-to-bead shape envelope. Further, it has been known that the reproduction level and an error rate for reproduction data greatly affects in digital recording with a certain threshold value. When the above-mentioned threshold value is set to A in FIG. 5, there is a period T during which the reproduction data can be detected, with a period equal to one period ($T_o$) of the reproduction RF envelopes.

In the digital VTR, video signals are digitalized, and synchronization data and ID information are added for every predetermined unit, and they are recorded on a tape in the form of an assembly of synchronized blocks in a small unit which can be demodulated. During reproduction, the signals are demodulated for every reproduced synchronized block, and are synthesized on a memory corresponding to a monitor screen, which are then delivered.

In consideration with the above-mentioned background, the control for the so-called fixation of a noise bar which has been carried out in the conventional VTR, is not required for the digital VTR, and further, no noise bar flows in a reproduction picture at a tape travel speed other than that of search which is an integer times (N times) as high. Further, on the contrary, an appropriate search speed is not always an integer times as high as that during recording. Accordingly, a problem such that stable control cannot be made when search having a high speed which is not an integer times as high is carried out, has been raised.

Further, in the above-mentioned new tracking system (2fATF system) or a 4fATF system, an ATF error signal having four track periods cannot be obtained, and in a case such that the above-mentioned two frames are recorded in twenty tracks, no tracking control can be made in such a way that a desired head traces a predetermined track in the two frames with a predetermined timing. Thus, there is proposed such a system that track number information in the two frames are mixed as ID with main signals and are recorded, and track jump is made in accordance with a reproduced track number so as to perform just-tracking on a predetermined track in the two frames with an ATF signal by 2fATF.

However, in a system in which a predetermined voltage is temporarily inserted in a tracking signal, as a track-jumping means, if the continuity between the above-mentioned ATF error and the above-mentioned predetermined voltage cannot be taken, stable control cannot be made, and accordingly, a problem such that a reproduced picture becomes unstable for a relatively long time has been raised.

SUMMARY OF THE INVENTION

The present invention is devised in view of the above-mentioned background, and accordingly, one object of the present invention is to solve the above-mentioned problems.

Another object of the present invention is to provide an information signal reproducing apparatus which can stably and satisfactorily perform tracking control even though a recording medium is fed at any speed.

To this end, according to a first aspect of the present invention, there is provided an information signal reproducing apparatus for reproducing information signals from a recording medium on which several parallel tracks are formed, comprising:

(a) head means for tracing the recording medium so as to reproduce signals, the head means including at least one rotary head;

(b) producing means for producing a tracking error signal by use of a signal reproduced by the head means;

(c) sampling means for sampling the tracking error signal, the sampling means having a sampling period which can be determined irrespective of a rotational period of the rotary head; and (d) control means for controlling a relative position between the recording medium and the head means in accordance with an output from the sampling means.

Further, the other object of the present invention is to provide an information signal reproducing apparatus which can sufficiently enlarge the lead-in range of tracking control without using a tracking control system.

To the end according to a second aspect of the present invention, there is provided an information signal reproducing apparatus for reproducing information signals from a recording medium, comprising:

(a) head means for tracing the recording medium so as to reproduce signals, the head means including at least one head;

(b) first producing means for producing a first tracking error signal in accordance with signals reproduced by the head;

(c) second producing means for producing a second tracking error signal without using signals reproduced by the head; and (d) control means for controlling a relative position between the recording medium and the head means by selectively using the first tracking error signal and the second tracking error signal.

Objects and features of the present invention other than those mentioned above will be apparent from explanation of embodiments of the present invention which will be hereinbelow detailed, with reference to the accompanying drawings in which:

BRIEF DESCRIPTION OF THE DRAWINGS

FIG. 9 is a block diagram illustrating a reproducing system and a recording system in a VTR in a second embodiment of the present invention;

FIGS. 10A and 10B are timing charts for explaining a tracking control signal in the apparatus shown in FIG. 9 in comparison with a conventional one;

DETAILED DESCRIPTION OF THE PREFERRED EMBODIMENTS

Figure 1A:
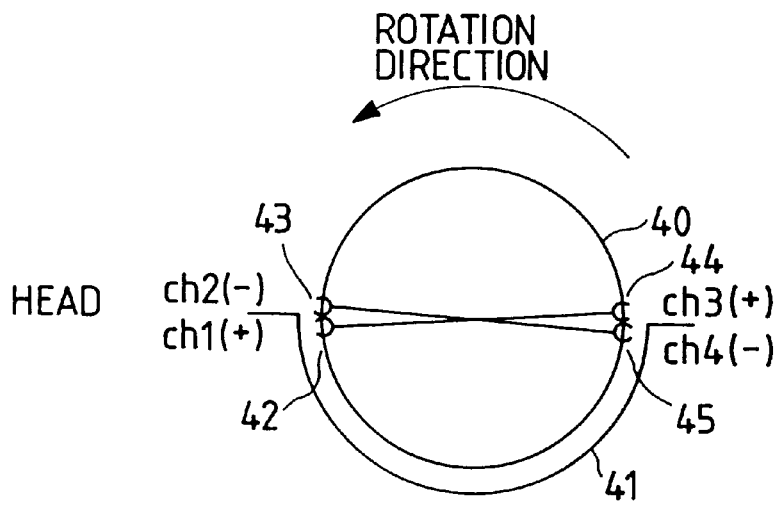
FIGS. 1A and 1B are views illustrating an arrangement of VTR heads and a drum which record two kinds of pilot signals at every other track.
Figure 1B:
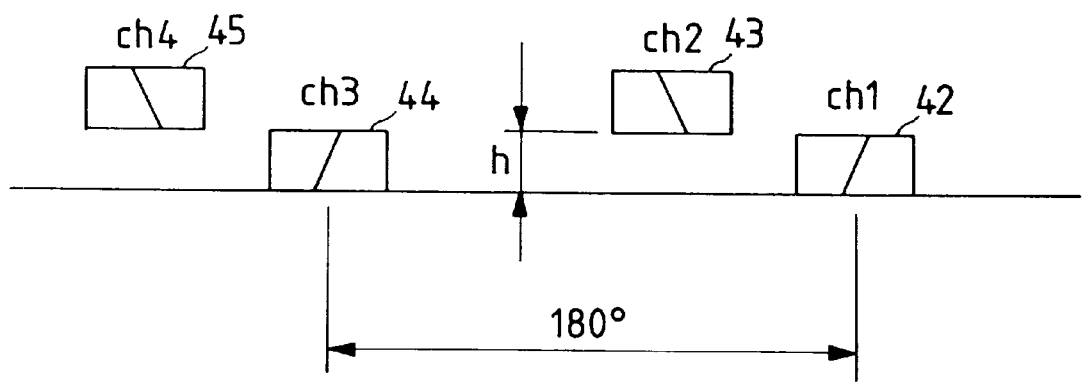
Figure 2:
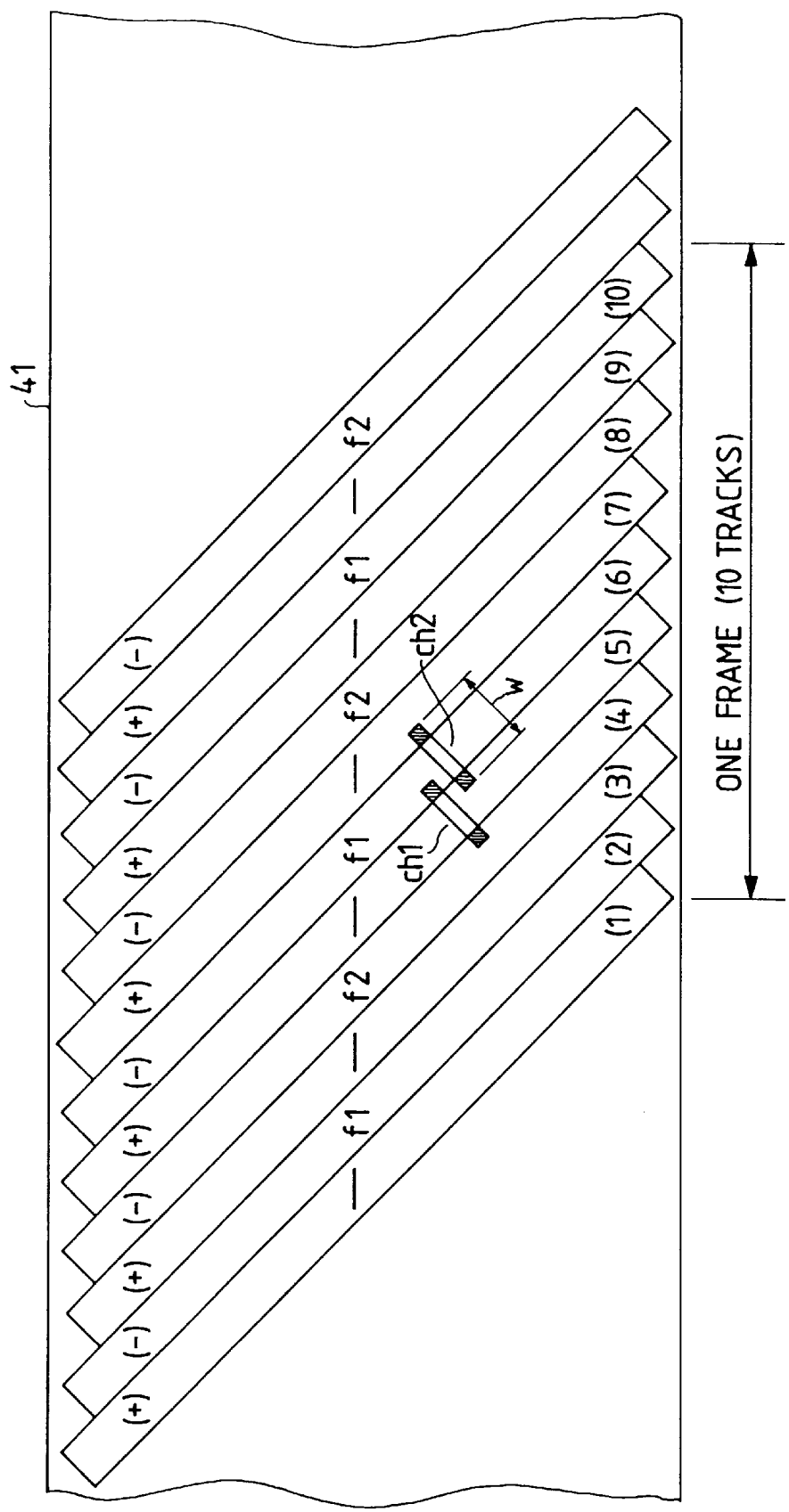
FIG. 2 is a view illustrating a recording pattern recorded on a tape by the heads shown in FIGS. 1A and 1B.
Figure 3:
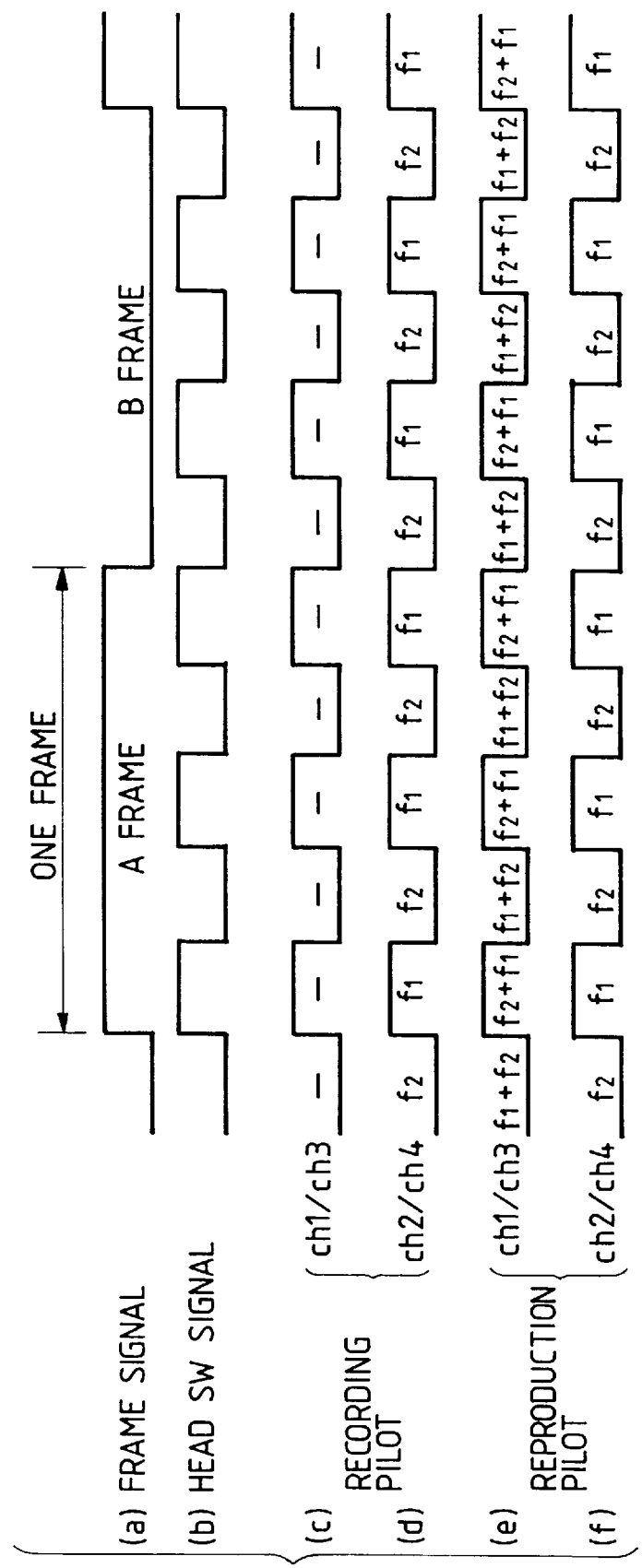
FIG. 3 is a timing chart for showing feed timing of recording signals for producing the recording pattern shown in FIG. 2.
Figure 4:
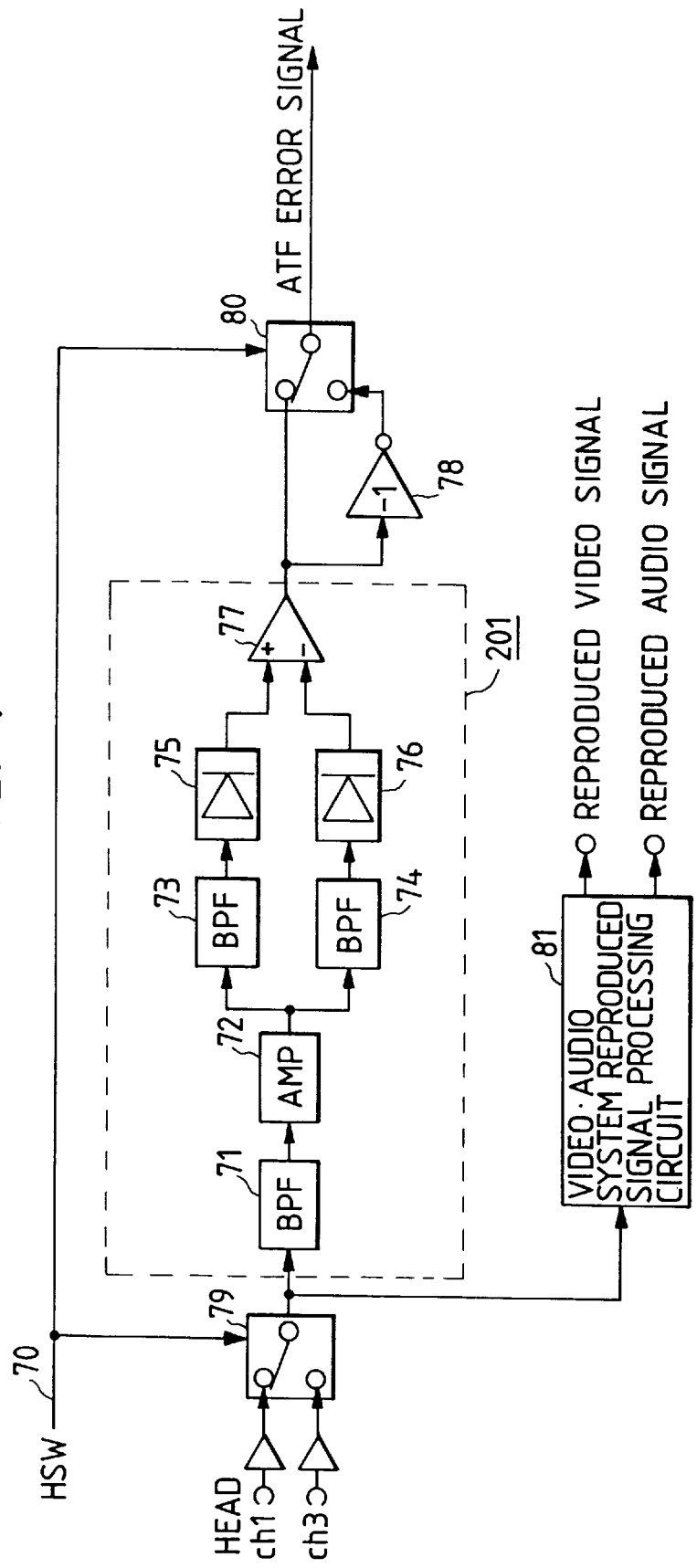
FIG. 4 is a block diagram illustrating a circuit arrangement for producing a tracking error signal upon reproduction of the recording pattern as shown in FIG. 2.
Figure 5:
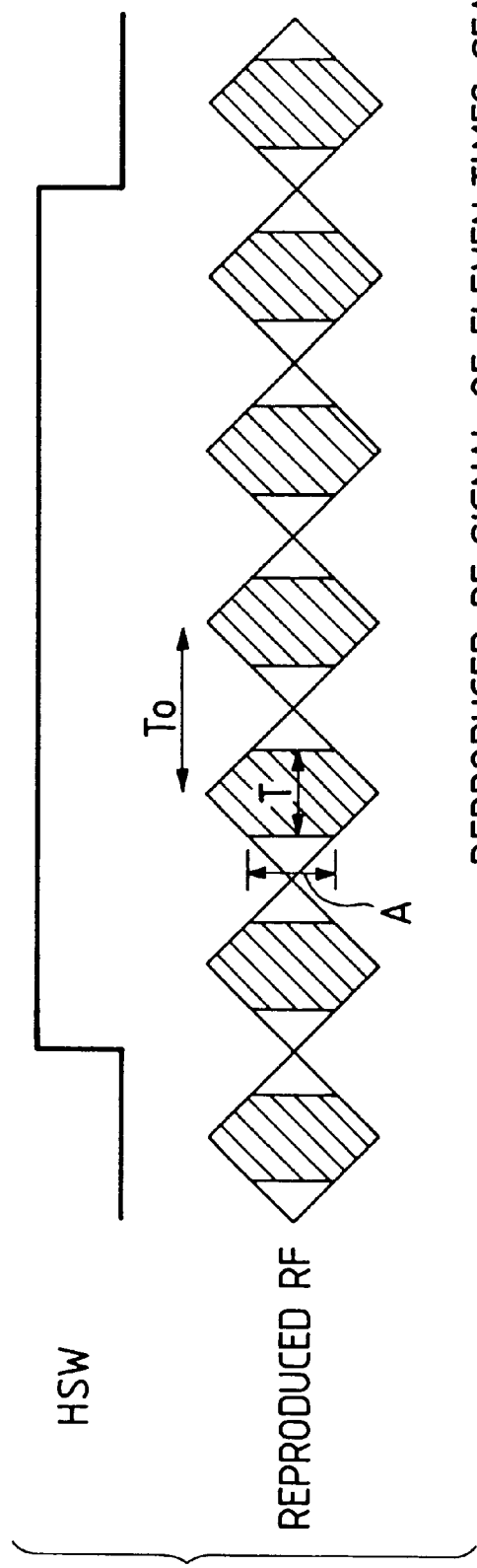
FIG. 5 is a view illustrating a head switch pulse and a reproduced envelope waveform when eleven time search is performed by a VTR.
Figure 6:
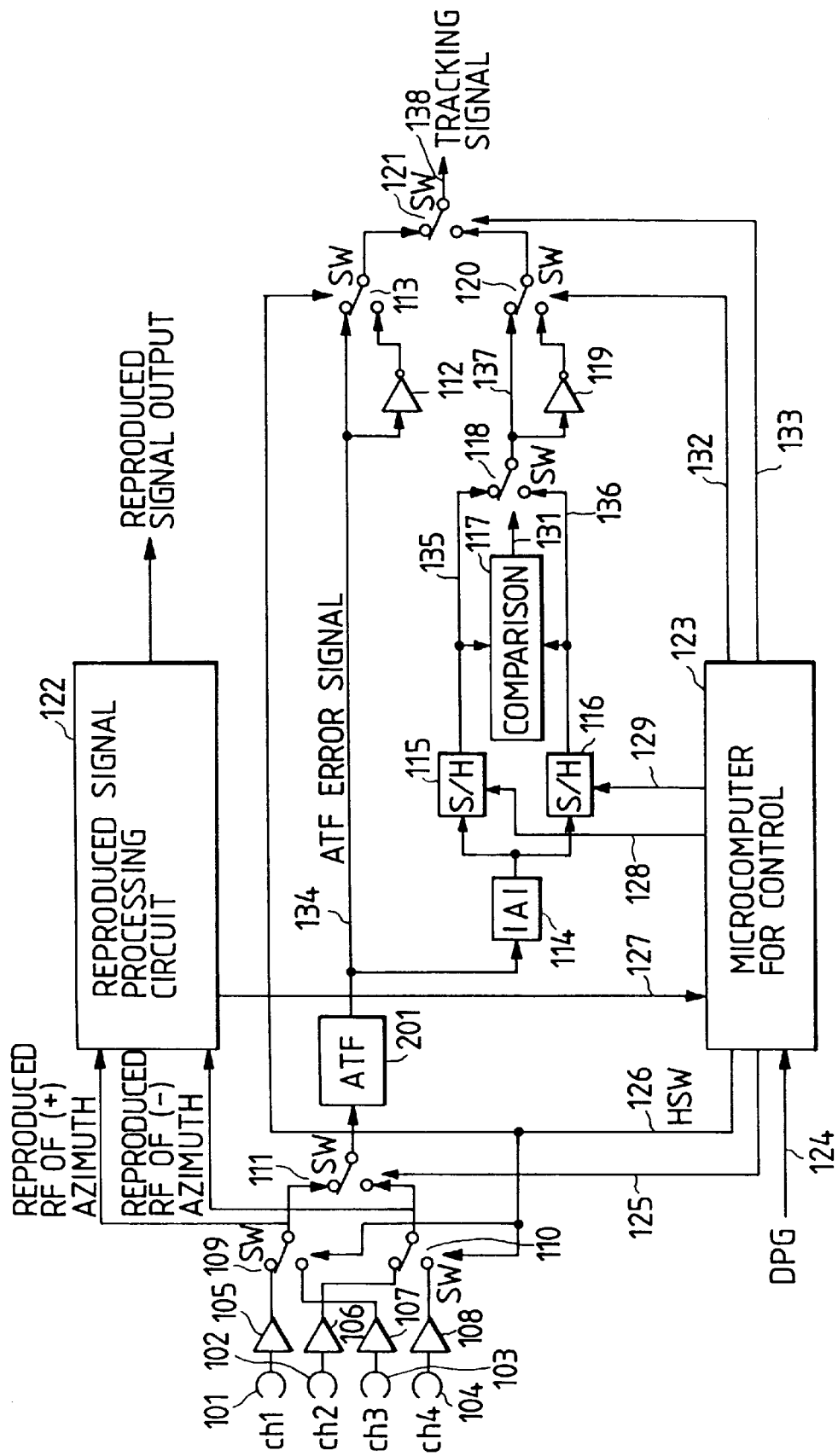
FIG. 6 is a schematic view illustrating an arrangement of a reproducing system and a control system in a VTR in a first embodiment of the present invention.

Referring to FIG. 6 which is a block diagram showing a first embodiment of the present invention, ch-1 to ch-4 representing rotary heads 101 to 104 are arranged as shown in FIGS. 1A and 1B. Amplifiers 105 to 108 amplify signals reproduced by the heads, and switch circuits 109, 110 select a reproducing head in synchronization with the rotation of a drum, the switch circuit 109 delivering reproduced RF signals from a +azimuth track while the switch circuit 110 delivers reproduced RF signals from a −azimuth track. A switch circuit 111 selects the reproduced signals from the +azimuth and −azimuth signals. In this figure, reference numeral 201 denotes an ATF circuit which is also shown in FIG. 4 where it is surrounded by a dotted line.

Reference numeral 112 denotes an inversion amplifier, and reference numeral 113 denotes a switch circuit for performing logical inversion of an ATF error signal 134 through exchange of two adjacent pilot signals caused by change-over between main reproduction tracks, in synchronization with the rotation of a head. An absolute circuit 114 provides an absolute value signal for a reference value of the ATF error signal 134, and a comparing circuit 117 detects a larger one of signals which are sample-held by S/H (sample-hold) circuits 115, 116. A switch circuit 118 selects a larger one of the sample-hold signals in accordance with a signal from the comparing circuit 117. Further, in this figure, reference numeral 119 denotes an inversion amplifier, 120, 121 denote switch circuits, and 122 denotes a reproduced signal processing circuit for demodulating both reproduced signals from the +azimuth and −azimuth tracks so as to provide video signals as main signals.

A microcomputer (control microcomputer) 123 for controlling the entire system, receives a drum PG signal (D-PG) so as to deliver various kinds of pulses synchronized with the drum PG signal, and further receives a reproduced track number 127 transmitted from the reproduced signal processing circuit 122 so as to deliver various control signals 125, 126, 128, 129, 132, 133 for optimum tracking control. Incidentally, reference numeral 138 denotes a tracking signal with which the tracking control is carried out.

Next, explanation will be hereinbelow made of the principle of the present embodiment with reference to FIG. 7 before operation of this embodiment is explained with reference to FIG. 6.

Figure 7:
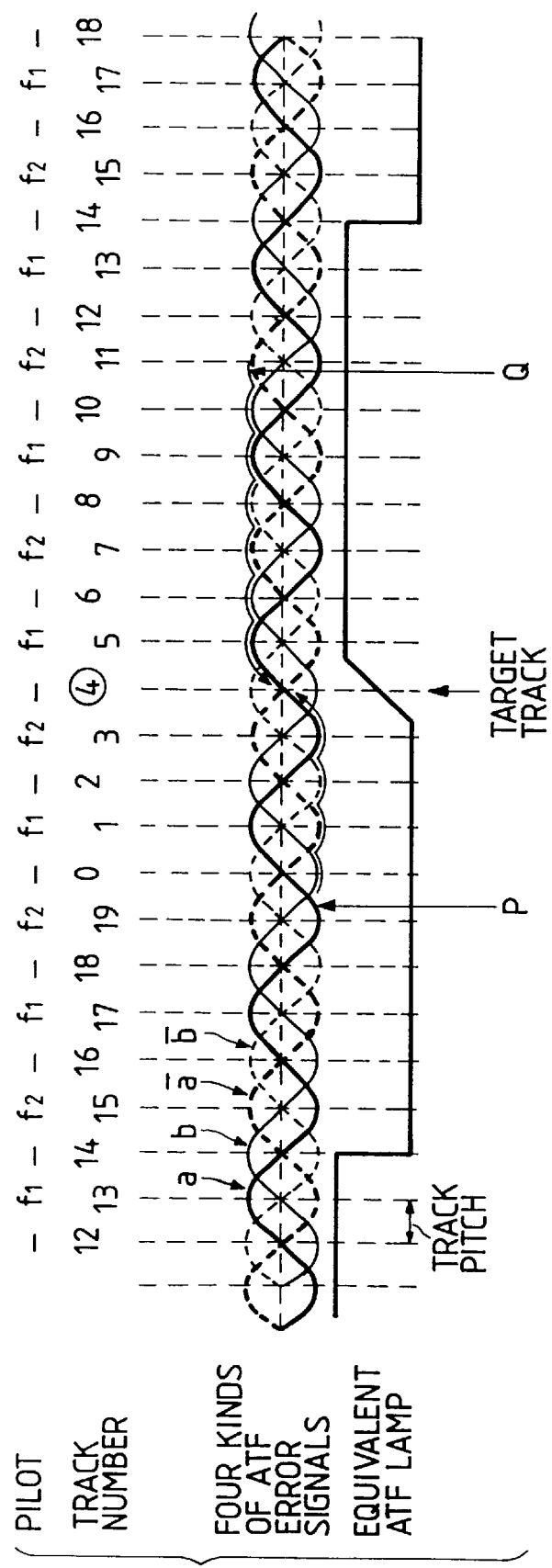
FIG. 7 is a block diagram showing a state of variation of tracking control signal in an apparatus shown in FIG. 6.

FIG. 7 shows the ATF error signal at an arbitrary position and also shows track numbers and pilot signals on the center lines (dotted lines) of tracks in such case that a target track to be tracked has a track number 4. Reference mark (a) denotes an ATF error signal which is obtained when a reproduced RF signal obtained from +azimuth head is inputted to the ATF circuit 201, and b denotes an ATF error signal which is obtained when an output from the −azimuth head is inputted to the ATF circuit 201.

As mentioned above, since only the above-mentioned ATF error signal given by reference mark a can be obtained by the ATF circuit 201 in a standard 2fATF system shown in FIG. 4, The ATF error signal has a zero error value at positions of track numbers 8, 12, 16, 0 in addition to the position of the track number 4. On the contrary, since the −azimuth head just traces one adjacent track, when a reproduced RF signal reproduced by the −azimuth head is used, the ATF error signal b having periods which are shifted by 90 deg. from that of the error signal a can be obtained.

In FIG. 7, inversion a and inversion b are inversion signals of the ATF error signals a, b. When the thus obtained four kinds of ATF error signals a, b, inversion a and inversion b are superposed with each other, it is found that a waveform resemble to a ramp waveform (equivalent ATF ramp) which is necessary for carrying out tracking control within twenty tracks in two frames can be obtained by selecting an appropriate signal at an arbitrary head position. The present invention is devised in view of this point.

For example, if the head is positioned at a point P in lead phase, the trace position of the head is subjected to tracking control onto a track having a track number 4 by successively selecting a, b, inversion a, inversion b and a in the mentioned order. Further, even at a point Q in lag phase, the tracking control onto the track having the track number 4 can also be made by successively selecting inversion a, b, a, inversion b, inversion a, b and a. The track numbers can be used for the selection of a, b, inversion a and inversion b.

Next explanation will be hereinbelow made of the operation of the arrangement in this embodiment with reference to FIG. 6.

As mentioned above, in order to select the ATF error a by using +azimuth head and the ATF error b by using the −azimuth head by use of the track numbers, once in one trace, that is, in order to obtain tracking information, once in one trace, it is required to change over the reproduced RF signals led to the ATF circuit 201 in the vicinity of the middle point of the trace. Accordingly, the switch circuit 111 are operated in association with the rotation of the drum. As a result, the thus obtained ATF errors a, b are held by the S/H circuits 115, 116 after they are led through the absolute circuit 114. The comparing circuit 117 compares both held data so that a larger one of |a| and |b| is obtained as an output signal 137 from the switch circuit 118.

This signal 137 is used for a tracking signal 138 through positive logic in the case of lag phase, but is used through negative logic in the case of lead phase. The inversion amplifier 119 and the switch circuit 120 are used for this purpose. Thus, track number information 127 from the reproduced signal processing circuit 122 is compared with a target track in the microcomputer 123, and accordingly, an appropriate logic control signal 132 is delivered.

Further, since the normal ATF error a becomes a tracking signal 138 within a range of ±1 with respect to the target track, the switch circuit 121 is suitably selected by a signal 133 from the microcomputer.

Figure 8:
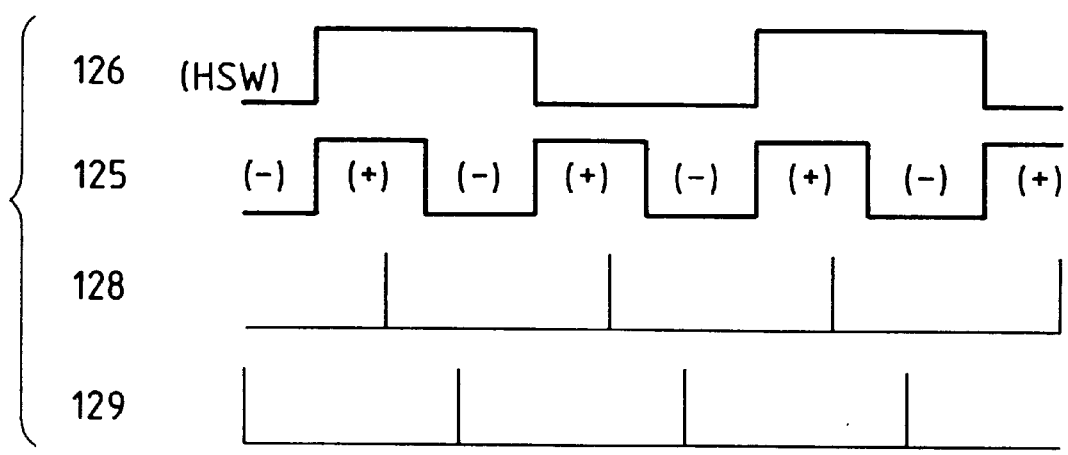
FIG. 8 is a timing chart showing signals in various parts shown in FIG. 6.

FIG. 8 shows a pulse timing chart for main pulses.

In this embodiment, since the system obtains tracking information once during one track trace period, the reproduced RF signal which is led to the ATF circuit 201 at the middle point of a head switch (HSW) signal 126 is changed over. Reference numerals 128, 129 denote sample pulses of |a| and |b|, respectively.

In the above-mentioned embodiment, although the arrangement using the 2fATF system for tracking in such a case that twenty tracks are recorded per two frames, this embodiment is also basically applicable if a system such as to track a desired one of tracks having a number larger than the periods of the ATF error signal by pilot recording, is used.

Further, in this embodiment, although the absolute circuit 114 is used, it is possible to arrange the system such that ATF error signals a, b, inversion a and inversion b are simply selected in accordance with track number information as necessary. Incidentally, although 0 to 19 track numbers are used to denote twenty tracks, such a system that 0 to 9 numbers are allocated respectively to ten tracks in one frame, and frame identification information is added, or the like among other various systems can be also used.

Further, in the above-embodiment, although all process steps for producing a tracking error signal are realized by hardware, but large number of signal process steps can be replaced with software process by a microcomputer.

Next, explanation will be hereinbelow made of a second embodiment.

FIG. 9 shows an arrangement of a reproducing system and control system in a digital VTR in this embodiment.

Referring to FIG. 9, there are shown a tape 501, a capstan 502, a capstan motor 503, a reproducing head 504, a rotary drum 505, a drum motor 506, a capstan motor FG 507, a speed discriminator (F-V converter) 508, and a capstan motor drive circuit 509.

Further, there are shown a drum motor FG 510, a speed discriminator (F-V converter) 511, a drum motor PG 512, and a phase discriminator (P-V converter) 513, a drum motor driver circuit 514, a phase reference generating timer 515 for controlling the rotational phase of the drum, a microcomputer 516 for carrying out system control, a preamplifier 517, a reproduced signal processing circuit 518 for video signals as main signals, an ATF circuit for providing a tracking error signal, a sample-hold circuit 520 and adders 521, 522.

Further, a detecting circuit 524 provides an envelope of a reproduced RF signal, and a sample pulse generating timer 523 produces sample pulses with predetermined periods under control of the microcomputer 516 and delivers the same to the S/H circuit 520.

Next, explanation will be hereinbelow made of the operation.

The reproducing head 504 provided in the rotary drum 505 traces a track on the tape 501, and a reproduced RF signal therefrom is processed by the reproduced signal processing circuit 518 after it is led through the preamplifier 517, so as to provide a video signal.

Meanwhile, the above-mentioned reproduced RF signal is applied to the ATF circuit 519 so as to obtain an ATF error signal in accordance with a reproduced pilot signal contained in the reproduced RF signal. The thus obtained ATF error signal is delivered to the sample hold circuit 520 so as to be sample-held by a phase reference pulse from the timer 515, and the thus obtained sample value is delivered to the adder 522.

The rotational speed of the capstan motor 503 for driving the capstan 502 for feeding the tape 501, is detected by the capstan motor FG 507, and is converted into a voltage by the F-V converter 508. The thus obtained voltage is added to the ATF error signal sampled as mentioned above, by the adder 522. The added output controls the rotation of the capstan 502 through the intermediary of the capstan motor drive circuit 509.

Further, the rotational speed and rotational phase of the rotary drum 505 are detected by the drum motor FG 510 and the drum motor PG 512, and are converted into voltages by the F-V converter 511 and the P-V converter 513, respectively. Thereafter, they are added together by the adder 521. The rotary drum 505 is controlled through the intermediary of the drum motor drive circuit 514 in accordance with the added output.

As mentioned above, since the ATF error signal is sample-held by a drum rotation reference pulse delivered from the timer 515 in order to fix a noise bar during high speed search, only reproduction having a speed which is N times as high can be made.

On the contrary, in this embodiment, as shown in FIG. 9, with the provision of the sample pulse generating timer 523 having exclusive periods, in addition to the drum phase reference generating timer 515, sample pulses which cope with not only the speed of the N times but also any other speed can be generated. With these sample pulses, the capstan speed is controlled by use of a signal sample-held by the S/H circuit 520, and accordingly, remarkably stable tape feed can be realized.

FIGS. 10A and 10B are views which show how the tracking signal varies by sample timing when the tape speed is changed.

FIG. 10A shows the tracking signal which the sampling is made at periods of the head switch (HSW), that is, in synchronization with the rotation of the drum, and FIG. 10B is the tracking signal in a condition in which the exclusive timer 523 is used. During ×5 search as shown in FIG. 10A, noise bar fixation in which a tracking signal continuously has a constant voltage so as be satisfactory, can be made. However, during ×6.66 search, the tracking signal varies so that the tape speed becomes unstable.

On the contrary, as shown in FIG. 10B, since the sample-hold is made by the exclusive periods ($t_1$), independent from the rotation of the drum, it is found that a stable tracking signal can be obtained even during round-off number search other than an integer N, such as ×6.66 search. Thus, the tape can stably travel at any speed.

Next, explanation will be made of a search speed magnification which is desirable for high speed reproduction (search) in a digital VTR.

Figure 11:
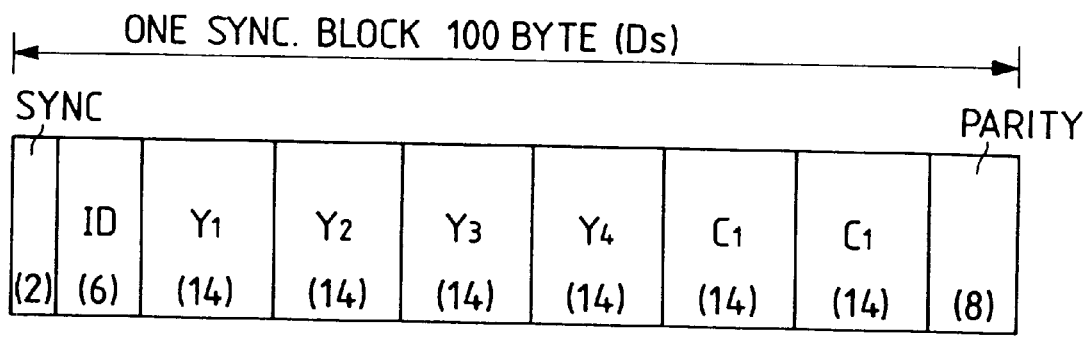
FIG. 11 is a view illustrating an arrangement of a synchronized blocks in digital signals recorded in the apparatus shown in FIG. 9.

FIG. 11 shows an example of a data format within a synchronized block as a data unit recorded by the digital VTR. $Y_1$ to $Y_4$ and $C_1$ and $C_2$ are data blocks in which image data concerning brightness and chromatic image data in a picture area in part are digitalized into 2:1 data capacity, and which are bundled into a minimum unit which can solely demodulated by adding synchronization data, added data ID and parity data. The synchronized block has a data volume of $D_s=100$ bytes.

Figure 12:
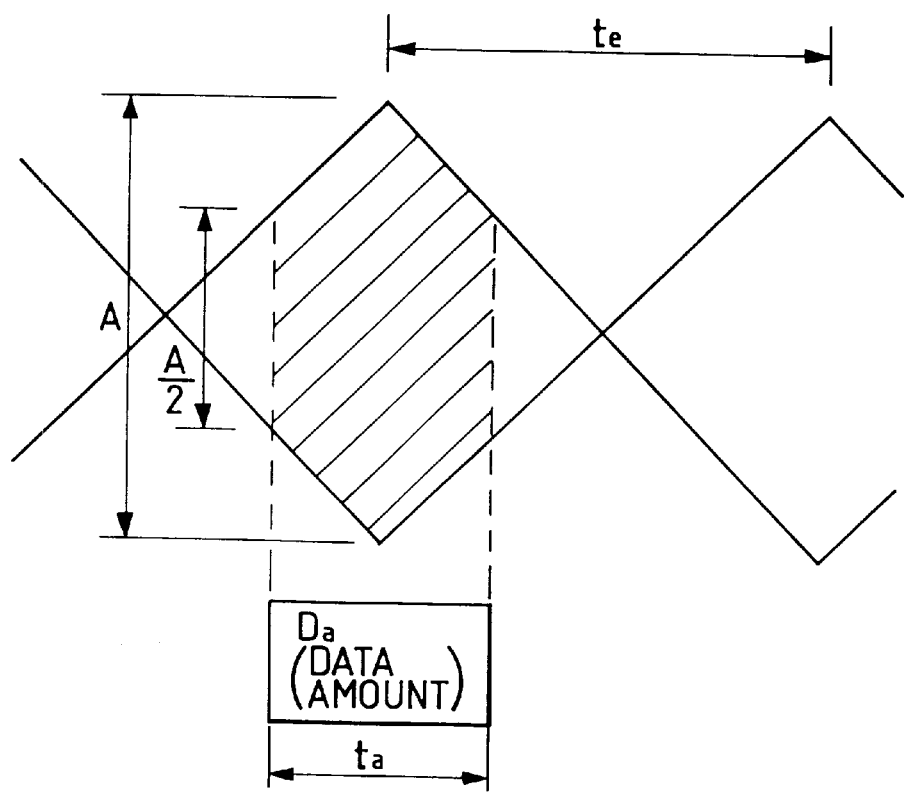
FIG. 12 is a view showing a relationship between a reproduced envelope waveform and a level capable of detecting data.

FIG. 12 shows an RF envelope during high speed search and a data volume $D_a$ which can be reproduced during a period ($t_a$) during which a data detection level (A) is exceeded. That is, a number of the synchronized blocks which can be included in the above-mentioned $D_a$ corresponds to the reproduction efficiency. Thus, in a case such as $D_a=N \times D_s$. (where N is an integer), a search magnification becomes highly efficient.

Search speed magnifications are exemplified hereinbelow by enumerating specific numerical examples: The following matters 1 to 4 are estimated:

1. the number $N_s$ of synchronized blocks contained in one track=150;
2. the time ratio ρ with which the reproduced FR envelope level exceeds the level A;
3. the search speed in a positive direction=($|S_f|$); and
4. the search speed in a reverse direction=($|S_r|$)

The following general formulae are used for obtaining search speeds:

$|S_f|=|1+N_s \times \rho \times (\frac{1}{2}^N)|$ (N: 0, 1, 2, 3)

$|S_r|=|1+N_s \times \rho \times (\frac{1}{2}^N)|$ (N: 0, 1, 2, 3)

A maximum speed with which positive search can be made is:

max$|S_f|=|1+150 \ (\frac{1}{2}) \times (\frac{1}{2}^0)|=76$ magnification.

Further, a next high search speed is:

$|S_f|=|1+150 \ (\frac{1}{2}) \times (\frac{1}{2}^1)|=38.5$ magnification.

Similarly, a next high search speed is:

$|S_f|=|1+150 \ (\frac{1}{2}) \times (\frac{1}{2}^2)|=19.75$ magnification.

As mentioned above, an optimum search speed is selected from the data reproduction efficiency, and accordingly, as shown in FIG. 9, stable tape feed control can be made even in a search magnification which is other than an integer. Accordingly, it is possible to realize an effective high speed search by use of a digital VTR.

Although the explanation has been made of an example of a digital VTR in the above-mentioned embodiment, the main signals may be not only video signals but also audio signals.

As mentioned above, according to the present invention, tracking control is carried out with the use of tracking pilot signals reproduced by the rotary head, and track number information within a frame recorded on a track, and accordingly, even with a system for allowing a head to track a desired track with track periods which exceed ATF error periods, it is not necessary to apply a fixed voltage as a tracking signal for track jump, thereby stable tracking control can be made.

Further, with the provision of the sample signal generating timer or the like for instructing sample-hold of an ATF error signal with predetermined periods, in addition to drum phase reference pulses, stable high speed reproduction can be realized at a tape speed having a magnification which is other than an integer.

Further, it is possible to determine a search speed having a highest degree of reproduction efficiency from the number $N_s$ of synchronized blocks which are recorded on a single track, and a time ratio ρ with which a reproduced envelope exceeding a level (A) necessary for detecting reproduced data can be obtained.

What is claimed is:

1. An information signal reproducing apparatus for reproducing information signals from a recording medium on which a multiplicity of parallel tracks are formed, comprising:

(a) head means for tracing said recording medium so as to reproduce signals, said head means including at least one rotary head;

(b) producing means for producing a tracking error signal by use of a signal reproduced by said head means, the tracking error signal being continuously indicative of a deviation of a tracing position of said head means from one of the tracks;

(c) timer means for operating to generate pulse signals at regular intervals of a predetermined period;

(d) selection means for selecting the predetermined period among a plurality of periods one of which is independent of a rotation period of the rotary head;

(e) sampling means for sampling the tracking error signal in response to the pulse signals; and (f) control means for controlling a relative position between said recording medium and said head means in accordance with an output from said sampling means.

2. An apparatus according to claim 1, further comprising conveying means for conveying said recording medium in a direction crossing a longitudinal direction of the tracks, wherein said selection means selects the predetermined period in accordance with a conveying speed of said recording medium.

3. An apparatus according to claim 2, further comprising means for controlling said conveying speed of the conveying medium at a speed at which only a predetermined integer number of synchronized blocks are just reproduced from one of the tracks among a number of synchronized blocks.

4. An apparatus according to claim 3, wherein the information signals are digital signals, and the synchronized signal blocks are composed of predetermined data including synchronization codes and information codes.

5. An apparatus according to claim 1, wherein pilot signals are recorded on said recording medium by superimposing on the information signals, and said producing means produces the tracking error signal by use of said pilot signal reproduced by said head means.

6. An information signal reproducing apparatus for reproducing digital information signals from a recording medium on which a multiplicity of parallel tracks are formed, said digital information signals are recorded in synchronized block units each including information codes and synchronization codes and composed of a predetermined amount of data, comprising:

(a) head means for tracing said recording medium so as to reproduce signals, said head means including at least one rotary head;

(b) conveying means for conveying said recording medium in a direction crossing said tracks; and (c) speed control means for controlling a conveying speed of said recording medium by said conveying means at a speed at which only a predetermined number of the synchronized blocks are reproduced from one of the tracks among a number of synchronized blocks, the speed being determined independently of a speed at which the recording medium is conveyed while the digital information signals are recorded.

7. An apparatus according to claim 6, further comprising means for producing a tracking error signal indicative of a deviation of a tracing position of said head means from one of the tracks by use of signals reproduced from said head means, and tracking control means for controlling a relative position between said head means and said recording medium in accordance with said tracking error signal.

8. An apparatus according to claim 7, wherein said tracking control means includes a sampling means for sampling said tracking error signal with periods in accordance with said conveying speed set by said setting means.

9. An information signal reproducing apparatus for reproducing information signals from a recording medium on which plural kinds of pilot signal components are recorded on a multiplicity of parallel tracks together with said information signals, comprising:

(a) head means for tracing said recording medium so as to reproduce signals, said head means including first and second heads which trace adjacent tracks;

(b) producing means for producing a first tracking error signal and a second tracking error signal, the first tracking error signal being indicative of a tracing position of the first head from one of adjacent i number of tracks formed in succession, the second tracking error signal being indicative of a tracing position of the second head from the one of the i number of tracks; and (c) control means for controlling a relative position between said recording medium and said head means by selectively using the first tracking error signal and the second tracking error signal so that the first and second heads are controlled to trace on one of j number of tracks formed in succession, where i and j are integers and j is greater than i.

10. An apparatus according to claim 9, wherein two kinds of pilot signals are alternately recorded on said recording medium at every other tracks, and said producing means produces the first and second tracking error signals by comparing reproduced levels of the two kinds of pilot signals.

11. An apparatus according to claim 9, wherein the first tracking error signal has one and the same value each time when a trace position of said head is shifted by the i number of tracks.

12. An apparatus according to claim 9, wherein track information relating to a position of a track is recorded on said recording medium for each of said tracks, and said control means selectively uses the first and second tracking error signals in accordance with said track information.

13. An apparatus according to claim 9, wherein track information relating to a position of a track is recorded on said recording medium for each of said tracks, and polarities of the first and second tracking error signals are determined in accordance with the track information.

14. An information signal reproducing apparatus for reproducing information signals from a recording medium on which plural kinds of pilot signals and track information relating to a position of a track are recorded on parallel tracks together with the information signals, comprising:

(a) head means for tracing the recording medium so as to reproduce signals, said head means including first and second heads which concurrently traces adjacent tracks;

(b) producing means for producing a first tracking error signal and a second tracking error signal, the first tracking error signal being indicative of a tracing position of the first head from one of the tracks, and the second tracking error signal being indicative of a tracing position of the second head from the one of the tracks; and (c) control means for controlling a relative position between the recording medium and said head means by selectively using the first and second tracking error signals based on the track information reproduced by said head means.

15. An apparatus according to claim 14, wherein said control means controls the relative position by using only the first tracking error signal while it is discriminated based on the track information that the tracking error is within one track.

16. An apparatus according to claim 14, wherein said control means determines polarities of the first tracking error signal and the second tracking error signal based on the track information.

17. An information signal reproducing apparatus for reproducing information signals from a recording medium on which plural kinds of pilot signals are recorded on parallel tracks together with the information signals, comprising:

(a) head means for tracing the recording medium so as to reproduce signals, said head means including first and second heads concurrently tracing adjacent tracks among the tracks of the recording medium;

(b) producing means for producing a tracking error signal;

(c) supply means for alternately supplying signals reproduced by the first and second heads to said producing means; and (d) control means for controlling a relative position between the recording medium and said head means by using the tracking error signal.

* * * * *

UNITED STATES PATENT AND TRADEMARK OFFICE
CERTIFICATE OF CORRECTION

PATENT NO. : 5,966,265
DATED : October 12, 1999
INVENTOR(S) : Nobutoshi Takayama It is certified that error appears in the above-identified patent and that said Letters Patent are hereby corrected as shown below:

Face Page [54] Delete "HAVING MEANS FOR TRACKING CONTROL" and insert
--WITH SELECTIVE SAMPLING OF ERROR SIGNAL CONTINUOUSLY INDICATIVE
OF TRACKING ERROR--.

Signed and Sealed this

Tenth Day of April, 2001

Attest:

NICHOLAS P. GODICI

Attesting Officer     Acting Director of the United States Patent and Trademark Office